(12) United States Patent
Chenn

(10) Patent No.: US 8,032,419 B2
(45) Date of Patent: Oct. 4, 2011

(54) METHOD OF PROVIDING DIAGNOSTIC INFORMATION IN CONNECTION WITH THE SALE OF PRE-OWNED VEHICLES

(75) Inventor: Ieon C. Chenn, Laguna Hills, CA (US)

(73) Assignee: Innova Electronics Corporation, Fountain Valley, CA (US)

( * ) Notice: Subject to any disclaimer, the term of this patent is extended or adjusted under 35 U.S.C. 154(b) by 191 days.

(21) Appl. No.: 12/558,418

(22) Filed: Sep. 11, 2009

(65) Prior Publication Data

US 2010/0005010 A1    Jan. 7, 2010

Related U.S. Application Data

(62) Division of application No. 11/166,718, filed on Jun. 24, 2005, now Pat. No. 7,603,293.

(51) Int. Cl.
G06Q 30/00 (2006.01)
(52) U.S. Cl. ................. 705/26; 701/29; 701/35
(58) Field of Classification Search .......... None
See application file for complete search history.

(56) References Cited

U.S. PATENT DOCUMENTS

| | | | |
|---|---|---|---|
| 2,960,654 A | 11/1960 | Nelson | |
| 3,646,438 A | 2/1972 | Staff | |
| 4,112,748 A | 9/1978 | Walley | |
| 4,176,315 A | 11/1979 | Sunnarborg | |
| 4,207,611 A | 6/1980 | Gordon | |
| 4,404,639 A | 9/1983 | McGuire et al. | |
| 4,684,896 A | 8/1987 | Weishaupt | |
| 4,689,573 A | 8/1987 | Hilmer | |
| 4,859,932 A | 8/1989 | Whitley | |
| 4,884,033 A | 11/1989 | McConchie, Sr. | |
| 5,003,478 A | 3/1991 | Kobayashi et al. | |
| 5,005,129 A | 4/1991 | Abe et al. | |
| 5,032,791 A | 7/1991 | Bates, Jr. | |
| 5,107,428 A | 4/1992 | Bethencourt et al. | |
| 5,157,708 A | 10/1992 | Garthwaite et al. | |
| 5,170,125 A | 12/1992 | Bates, Jr. | |
| 5,214,582 A | 5/1993 | Gray | |
| 5,247,245 A | 9/1993 | Nelson | |
| 5,278,508 A | 1/1994 | Bowman | |
| 5,285,163 A | 2/1994 | Liotta | |
| 5,359,290 A | 10/1994 | Cervas | |
| 5,394,093 A | 2/1995 | Cervas | |
| 5,400,018 A | 3/1995 | Scholl et al. | |
| 5,481,906 A | 1/1996 | Nagayoshi et al. | |
| 5,491,418 A | 2/1996 | Alfaro et al. | |

(Continued)

OTHER PUBLICATIONS

"ADESA Post Sale Inspection Promotes Dealer Value", by A. Bing, published Mar. 8, 2001.*

(Continued)

Primary Examiner — Luna Champagne
(74) Attorney, Agent, or Firm — Stetina Brunda Garred & Brucker

(57) ABSTRACT

A method of assisting sellers and buyers in the sale and purchase of a vehicle is provided. The method may comprise the steps of communicating a vehicle's diagnostic data (e.g., OBD codes, etc.) with a provider. The method may further comprise the step of analyzing the communicated diagnostic data. The method may also comprise the step of preparing a vehicle diagnostic report based on the communicated diagnostic data. The method may also comprise the step of uploading the prepared report to a report database retrievable by a buyer.

19 Claims, 4 Drawing Sheets

U.S. PATENT DOCUMENTS

| | | | |
|---|---|---|---|
| 5,506,772 | A | 4/1996 | Kubozono et al. |
| 5,541,840 | A | 7/1996 | Gurne et al. |
| 5,635,841 | A | 6/1997 | Taylor |
| 5,657,233 | A | 8/1997 | Cherrington et al. |
| 5,758,300 | A | 5/1998 | Abe |
| 5,916,286 | A | 6/1999 | Seashore et al. |
| 6,225,898 | B1 | 5/2001 | Kamiya et al. |
| 6,263,265 | B1 | 7/2001 | Fera |
| 6,263,322 | B1 | 7/2001 | Kirkevold et al. |
| 6,295,492 | B1 | 9/2001 | Lang et al. |
| 6,330,499 | B1 | 12/2001 | Chou et al. |
| 6,535,802 | B1 | 3/2003 | Kramer |
| 6,687,584 | B2 | 2/2004 | Andreasen |
| 6,739,514 | B2 | 5/2004 | Sanders et al. |
| 7,028,002 | B2 | 4/2006 | Wakabayashi |
| 2001/0053983 | A1 | 12/2001 | Reichwein et al. |
| 2002/0016655 | A1* | 2/2002 | Joao ............................... 701/35 |
| 2002/0156692 | A1 | 10/2002 | Squeglia et al. |
| 2002/0193925 | A1 | 12/2002 | Funkhouser et al. |
| 2003/0060953 | A1 | 3/2003 | Chen |
| 2005/0025390 | A1 | 2/2005 | Tsujii |
| 2005/0143882 | A1* | 6/2005 | Umezawa ....................... 701/29 |
| 2005/0156028 | A1 | 7/2005 | Chirnomas |

OTHER PUBLICATIONS

Primmer, Bog, "Advice sought on selling a car privately". http://groups.google.com/group/rec.autos/browse_thread/thread/4e6103ddc4499866?q+buy+car+inspection.

Http://web.archive.org/web/20020403231822/http://carmarket.com/PrePurch.cfm "Carmarket's Used Car Pre-Purchase Inspection Guidelines".

www.CarFax.com "Order Carfax Reports" Copyright 2003.

* cited by examiner

METHOD OF PROVIDING DIAGNOSTIC INFORMATION IN CONNECTION WITH THE SALE OF PRE-OWNED VEHICLES

CROSS-REFERENCE TO RELATED APPLICATIONS

This application is a Divisional of U.S. patent Ser. No. 11/166,718 filed on Jun. 24, 2005 now U.S. Pat. No. 7,603,293.

STATEMENT RE: FEDERALLY SPONSORED RESEARCH/DEVELOPMENT

Not Applicable

BACKGROUND

The present invention relates to a method of assisting buyers and sellers in the sale and purchase of a vehicle based on a diagnostic report derived from OBD trouble codes stored in a vehicle's computer.

Automobiles or vehicles may be sold as new or used. If new, then purchasers are not concerned about wear and tear of the vehicle or broken components because new vehicles are tested at the factory. However, after the new vehicle has been purchased by a buyer and driven for a certain amount of time and mileage, various components of the vehicle may develop wear and tear thereby degrading the performance and reliability of the vehicle. Once the vehicle has been driven, purchasers become concerned that the vehicle may contain hidden defects which may not be readily noticeable.

The prior art has addressed the above mentioned concern of buyers through means which are (1) ineffective and inexpensive or (2) effective but expensive. For example, the buyer may have an automobile mechanic inspect the vehicle to be purchased detailing the major and minor components which may require repair upon purchase of the vehicle. The mechanic may test drive the vehicle and visually inspect the various components of the vehicle as well as test various components of the vehicle via a component tester. However, an inspection of the vehicle by the mechanic may be too expensive in view of the overall cost of the vehicle. Accordingly, except for highly priced vehicles, a mechanic typically does not pre-inspect vehicles for buyers prior to purchase of the vehicle.

Another method by which the buyer may address his/her concerns regarding the wear and tear of the vehicle is through public records obtained from the Department of Motor Vehicles (DMV). In particular, the public records of the DMV may contain information such as the number of previous owners, whether the vehicle passed smog, whether the car is a lemon and other like information. This information is fairly inexpensive; however, the information may be unreliable or not particularly relevant based on a view that DMV records relate to information which may be months to years old.

Accordingly, there is a need for an improved method of assisting a buyer and a seller in the sale and purchase of a vehicle.

BRIEF SUMMARY

A method of assisting sellers and buyers in the sale and purchase of a vehicle is provided wherein diagnostic data from the vehicle to be sold is downloaded by the seller to a diagnostic report provider, analyzed by the provider, and a diagnostic report is prepared based on the downloaded data and made accessible to a plurality of buyers such that buyers may take the diagnostic report into consideration when purchasing the vehicle. In particular, the method may comprise the steps of receiving a vehicle's OBD codes by a diagnostic report provider, analyzing the received codes, preparing a vehicle diagnostic report based on the received codes, and uploading the prepared report to a report database retrievable by a buyer.

In the analyzing step, the received codes may be compared to a vehicle diagnostic database and problem description database to determine whether the codes indicate that the vehicle requires repairs. Additionally, a service adviser may review the received codes to determine other possible causes of code faults. Once the received codes are analyzed, a report may be prepared which lists the general vehicle identifying information such as make, model, year and engine size as well as vehicle identification number. The report may also contain information regarding possible repairs that will need to be performed once the vehicle is purchased. The report may also provide an estimated cost of the repairs. To this end, the codes may be correlated to determine whether the seller has tampered with the vehicle's computer so as to alter the codes to hide possible problems with the vehicle. A reliability index may be associated with the report to provide buyers with an assurance that the report is reliable.

The report may be provided to vehicle buyers through a website (i.e., report database). In particular, the website may be loaded with a plurality of reports of many vehicles. The report provider may derive a revenue stream through providing reports to vehicle buyers. In particular, buyers may pay the provider a set fee for viewing a single report. Alternatively, buyers may pay the provider a subscription fee for accessing an unlimited or limited number of reports contained in the provider's database. The report provider may also derive a revenue stream from the sellers of the vehicles. In particular, the provider may charge the seller a fee for analyzing their vehicle's OBD codes and listing their vehicle's diagnostic report.

BRIEF DESCRIPTION OF THE DRAWINGS

These and other features and advantages of the various embodiments disclosed herein will be better understood with respect to the following description and drawings in which.

DETAILED DESCRIPTION

Figure 1:
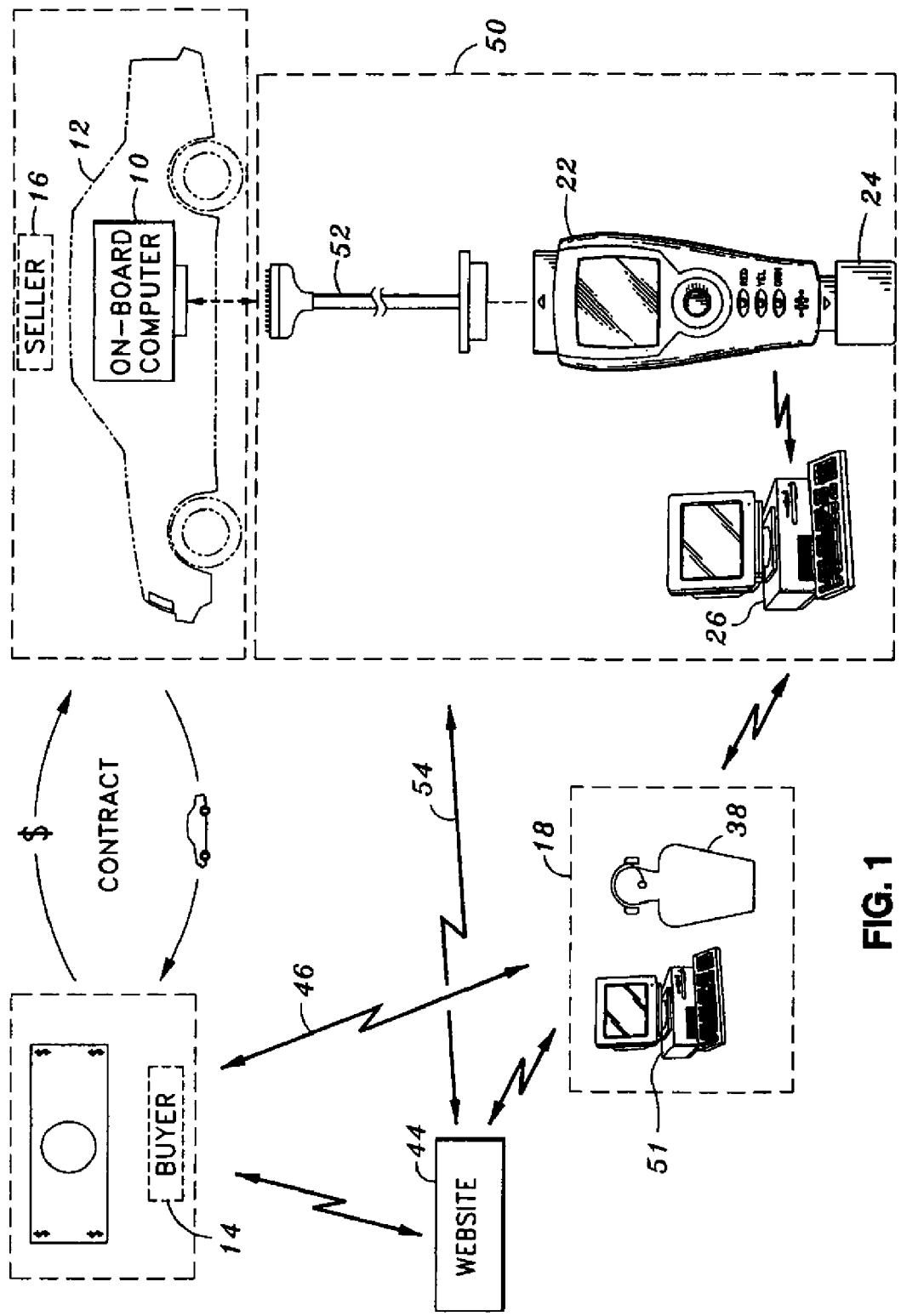
FIG. 1 is a pictorial diagram of a diagnostic report provider assisting a buyer and seller of a vehicle in the transfer of ownership of such vehicle.

Referring now to FIG. 1, a pictorial diagram is shown illustrating the method by which OBD codes may be downloaded from an onboard computer 10 of a vehicle 12 to be sold and presented to a buyer 14 or a plurality of buyers 14 such that the buyer 14 may consider the information derived from the downloaded OBD codes in purchasing the seller's vehicle 12. The derived information may aid the buyer 14 in determining whether to purchase the vehicle 12. In particular, the derived information may provide information regarding required repairs that would have to be completed upon the purchase of the vehicle 12. Also, the derived information may also aid the seller 16 in selling the vehicle 12 when the diagnostic data (e.g., OBD codes, etc.) stored on the vehicle's computer 10 show that the vehicle 12 does not need to be repaired upon purchase thereby increasing the desirability of the vehicle 12.

Figure 4:
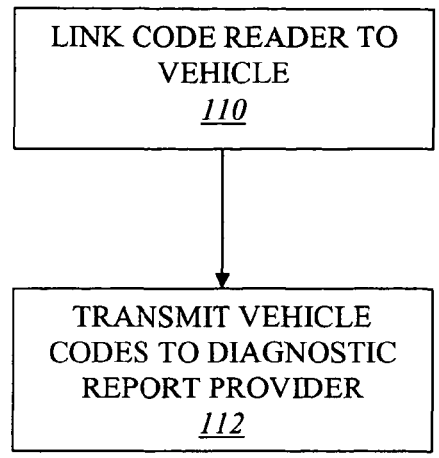
FIG. 4 is a flow chart illustrating steps a seller may perform to use the diagnostic data stored in the seller's vehicle to sell the vehicle.

To this end, the seller 16 of a vehicle 12, which is OBD compliant, may download codes stored on the vehicle's computer 10 and transmit the downloaded codes to a diagnostic report provider 18 as shown pictorially in FIG. 1 and in the flow chart of FIG. 4. It is also contemplated that the buyer 14 downloads and transmits the codes to the provider 18. The OBD compliant vehicle 12 may have a plurality of sensors attached to various components of the vehicle 12. The sensors sense the components statuses when the vehicle 12 is in normal running condition as well as in factory defined and government defined test conditions. The sensed statuses of the components are transmitted and stored on the onboard computer 10 of the vehicle 12. The component status codes stored in the onboard computer 10 typically is the most recent diagnostic data for the vehicle 12. More particularly, the stored codes may contain codes relevant to the last time the seller 16 drove the vehicle 12. Such information may be useful to the seller 16 in selling the vehicle 12 at a premium especially if the codes evidence a well maintained vehicle 12 or a vehicle 12 that does not require extensive repair. The seller 16 may transmit the codes to the diagnostic report provider 18 who in turn prepares and makes a diagnostic report 20 (see FIGS. 2 and 3) available for viewing to potential buyer(s) 14 of the vehicle 12 wherein the report 20 indicates the vehicle's condition based on the transmitted codes.

To download the codes stored on the vehicle's computer 10, a code reader 22 may be placed in communication with the onboard computer 10. By way of example and not limitation, the code reader 22 may be a model 3030 code reader marketed by Equus Products, Inc. of Fountain Valley, Calif. The code reader 22 may download the codes stored on the onboard computer 10 via a communications link cable 52. Once the codes have been downloaded into the code reader 22, the code reader 22 may be placed in communication with the diagnostic report provider 18. By way of example and not limitation, the communication between the code reader 22 and the diagnostic report provider 18 may be established via blue tooth technology, cell phones, telephone land lines, a computer 26 connected to the internet, or any means by which the data (e.g., downloaded codes, etc.) in the code reader 22 may be communicated or transmitted to the diagnostic report provider 18. As shown in FIG. 1, the code reader 22 transmits the downloaded data to the computer 26 which may communicate with the provider 18 via the internet.

Figure 2:
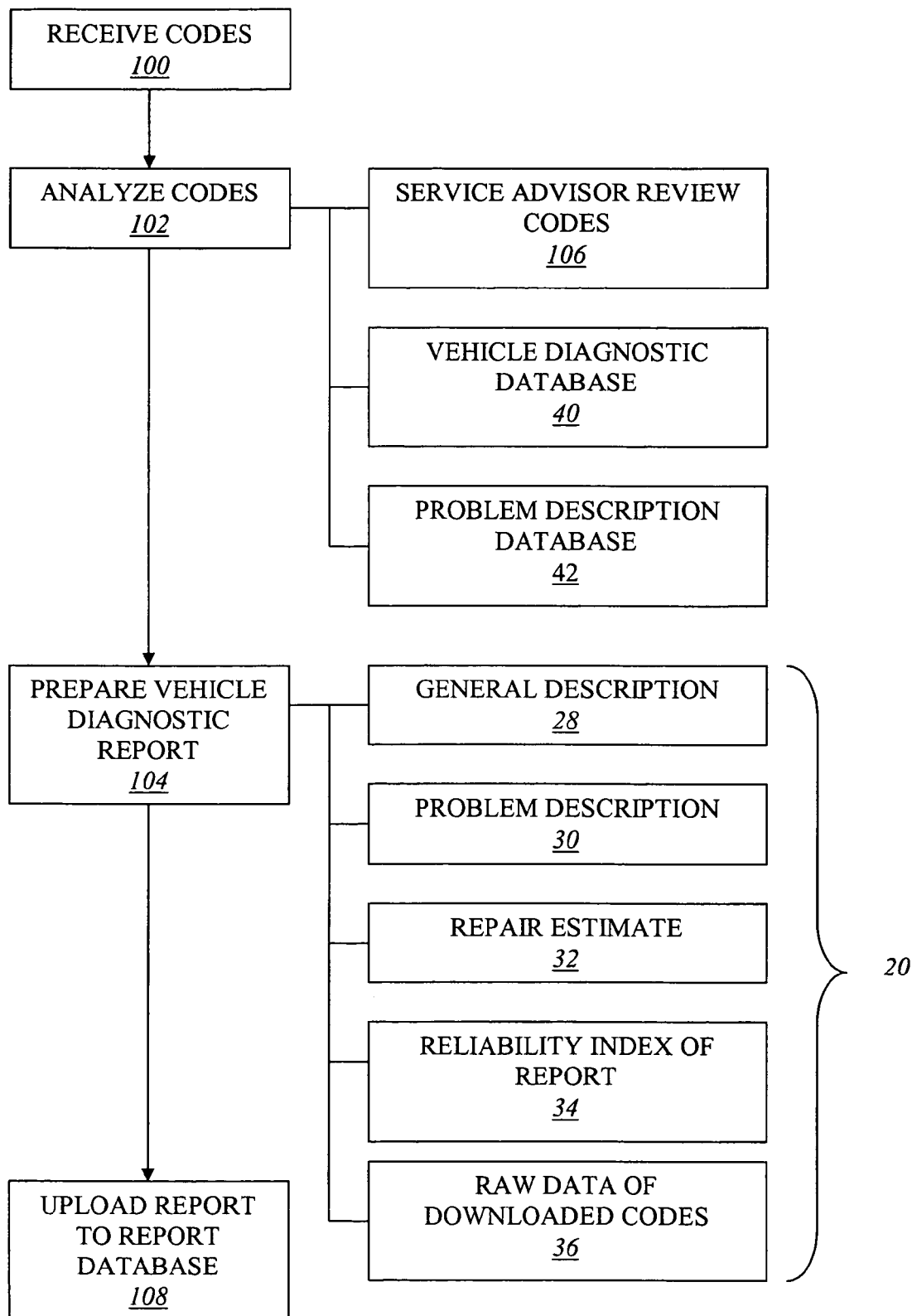
FIG. 2 is a flow chart illustrating steps a diagnostic report provider may perform to assist the buyer and seller in the sale of the vehicle.

Referring now to FIG. 2, once the diagnostic report provider 18 has received the codes (step 100), the diagnostic report provider 18 may begin to analyze the codes (step 102) to determine general vehicle information 28, a problem description 30 of various problems of the vehicle, a repair estimate 32 and a reliability index 34 of the report 20. Once the codes have been analyzed by the provider 18, the provider 18 prepares (step 104) the vehicle diagnostic report 20 which may contain the general vehicle information 28, a problem description 30, a repair estimate 32, a reliability index 34, and also the actual raw data of the downloaded codes 36 from the vehicle's computer 10 which may be confirmed later by a third party. The general vehicle information 28 may include the year, make, model, engine size, vehicle identification number (VIN), and other general information regarding the vehicle 12.

The codes received by the diagnostic report provider 18 may indicate various possible problem areas with the vehicle 12. By way of example and not limitation, the codes may indicate a potential problem with the vehicle's oxygen sensor. Additionally, based on the codes, an estimated cost to fix the various problem areas may be generated to provide the buyer 14 a gauge as to the amount of repairs needed once the vehicle 12 is purchased. The codes received by the diagnostic report provider 18 may be correlated amongst each other so as to validate the received codes and ensure that the seller 16 has not tampered with the vehicle's computer 10 prior to transmission of the codes to hide potential problems with the vehicle 12.

Once the codes from the code reader 22 are received by the diagnostic report provider 18, a service adviser 38 of the provider 18 may review the received codes (step 106). The service provider 38 may determine based on his/her experience whether the received codes are within expectations based on the year, make, model of the vehicle 12, etc. Additionally, the service adviser 38 may review the codes in light of a vehicle diagnostic database 40. The database 40 may comprise a list of possible diagnosis based on the received codes. Also, the codes may be analyzed in view of a problem description database 42. The problem description database 42 may comprise a listing of a problem description associated with a particular trouble code. The service adviser 38 may review the codes to determine whether the codes conflict thereby indicating that the seller 16 may have tampered with the vehicle's computer 10. Once the service adviser 38 has checked for potential conflicts in the codes, the service adviser 38 may enter a reliability index 34 for the report 20 prepared by the service adviser 38. The reliability index 34 may be a scale of "1" to "5" wherein "1" indicates that the seller 16 has not tampered with the vehicle's computer 10, a "5" indicates that the seller 16 has tampered with the vehicle's computer 10, and "2" through "4" indicates varying degrees of possible tampering of the vehicle's computer 10 by the seller 16. The reliability index 34 may also flag possible causes of conflicts between the codes.

The diagnostic report 20 prepared by the provider 18 may be uploaded (step 108) to a report database 44 (see FIG. 3; e.g., web site, etc.) having a password protect mechanism such that permission to view the prepared report 20 may be granted or denied by the diagnostic report provider 18. The diagnostic report provider 18 may permit access to the diagnostic report 20 based on whether payment for such display has been made. For example, the provider 18 may allow potential buyers 14 to access a website 44 via a user name and password of the buyer 14 wherein the website 44 displays the report 20 once the buyer's user name, password and payment for the report 20 has been confirmed. Alternatively, the provider 18 may store the prepared report 20 in a storage medium of a computer. The computer may provide for a fax back system or an email auto-responder in which the buyer 14 may order the report over the phone or internet, and the computer would fax or email the report to the buyer 14.

Payment for the diagnostic report 20 may be provided by the buyer 14 of the vehicle 12. For example, the provider 18 may permit buyers 14 to access a database 44 containing the diagnostic reports 20 of a plurality of vehicles 12. Buyers 14 may purchase an unlimited number of reports 20 for a fixed fee or on a per report 20 basis. Alternatively, the provider 18 may permit access to the vehicle's diagnostic report 20 by any buyer upon payment of a fee by the buyer.

The codes, and more particularly, the diagnostic report 20 derived from the trouble codes stored on the vehicle's computer 10 is useful for buyers 14 in determining whether to purchase the vehicle 12. For example, the diagnostic report 20 informs buyers of an estimated repair cost to fix the problems indicated by the vehicle's stored trouble codes. The estimated repair cost may be broken down in terms of the minimum and maximum range of estimated repair costs as well as suggested short term repairs and long term repairs. The buyer 14 may also contact the service advisor 38 to discuss the problems indicated by the vehicle's stored trouble codes, as shown by communications path 46 in FIG. 1. This may help the buyer 14 in determining whether to purchase the vehicle 12. The buyer 14 may view the diagnostic report 20 of a specific vehicle 12 via the web site 44 to which the diagnostic report 20 has been uploaded and permission granted to the buyer 14 to view the diagnostic report 20. Alternatively, the buyer 14 may have the report 20 faxed or otherwise transmitted to himself/herself.

The codes, and more particularly, the diagnostic report 20 derived from the trouble codes stored on the vehicle's computer 10 may also be useful for sellers 16 to obtain a premium for the vehicle 12. The reason is that if the codes indicate that the vehicle 12 is in excellent operating condition then the seller 16 may promote the vehicle 12 as such and should be able to capture a premium for the vehicle 12.

Figure 3:
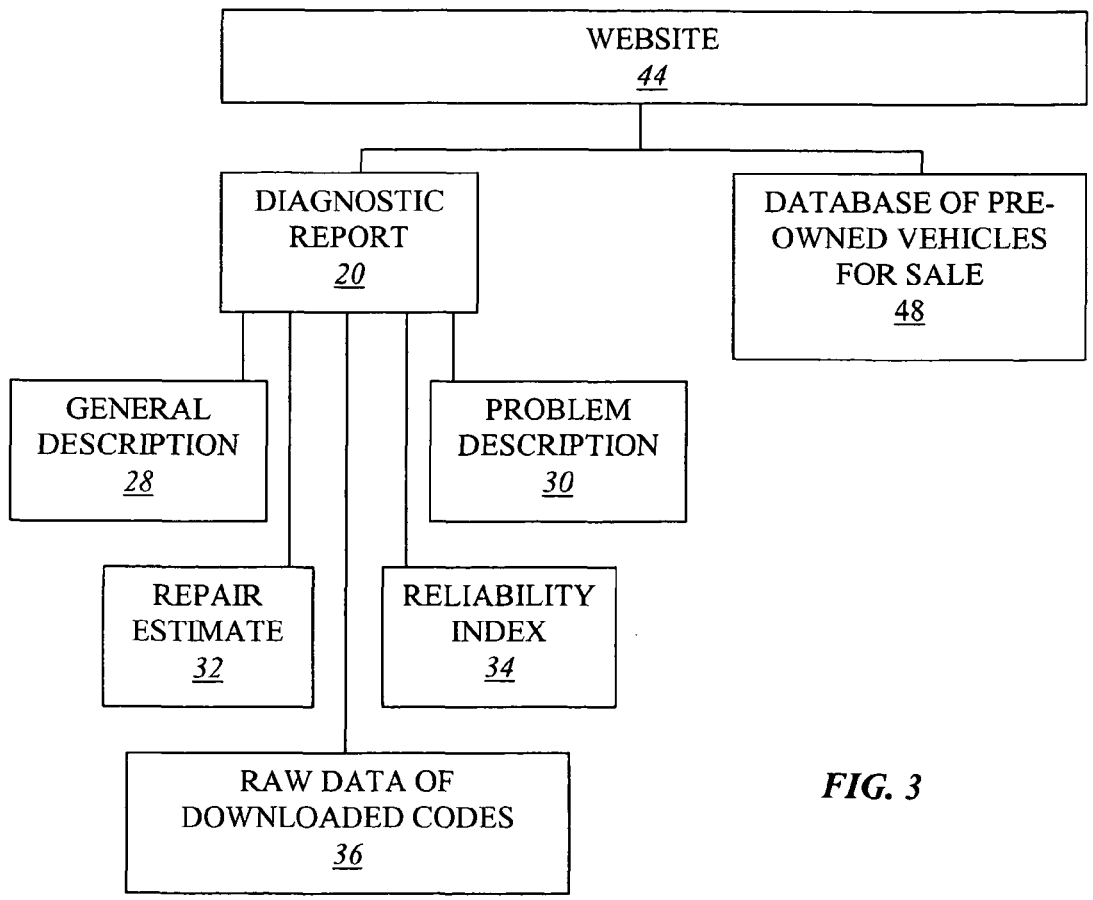
FIG. 3 is an exemplary index of various information accessible on a website of the diagnostic report provider.

In a typical transaction, the seller 16 has posted his/her vehicle 12 on a website or database of pre-owned vehicles for sale 48 (see FIG. 3), or other listing indicating that his/her vehicle 12 is for sale. FIG. 3 illustrates the database 48 and the diagnostic report 20 being accessible from a common website 44; however, it is also contemplated that the database 48 and the diagnostic report be accessible on separate and different websites. Prior to the posting, the seller 16 may download and transmit the trouble codes in the seller's vehicle computer 10 to the diagnostic report provider 18. It is also contemplated that the buyer 14 download and transmit the codes to the provider 18 after the buyer has identified the vehicle 12 to be purchased. The provider 18 may analyze (step 102) the received trouble codes then prepare (step 104) a diagnostic report 20 to be posted (step 108) on a website 44 or otherwise made available to potential buyers 14 of the vehicle 12 as shown in FIG. 2. The provider 18 may associate the report 20 with a unique identification number such as the vehicle identification number such that potential buyers 14 may request the diagnostic report 20 from the provider 18 by identifying the unique identification number. The seller 16, in promoting the sale of his/her vehicle 12, may list the report's unique identification number and the means of contacting the provider 18 to request the report 20 (e.g., list provider's website, etc.).

The seller 16 (or buyer 14) may have the codes stored on the vehicle's computer 10 transmitted to the report provider 18 at a service station 50 (see FIG. 1). By way of example and not limitation, the service station 50 may be an automobile parts retail store such as Pep Boys, an independent mechanic, a service shop of an automobile dealer, and the like. The seller 16 (or buyer 14) may request that the service station 50 merely download and transmit the raw OBD trouble codes from the vehicle's computer 10 without any further testing of the vehicle 12 by the service station 50. In the alternative, the seller 16 (or buyer 14) may request the service station 50 to run the vehicle 12 through factory defined test conditions as well as government defined test conditions prior to downloading and transmitting the codes stored on the vehicle's computer 10. The reason is that running the vehicle 12 through these additional test conditions provides more detailed information regarding the condition of the vehicle 12.

The service station 50 may transmit the downloaded codes to the provider 18 via the internet, fax, mail and the like. For example, the service station 50 may capture the downloaded codes in electronic format and email the downloaded codes to the provider's computer 51. Alternatively, the service station 50 may log onto a website 44 of the provider 18 as shown by communications path 54 which may provide step by step instructions to transmit the downloaded codes to the provider 18.

In a further alternative method of transmitting the codes to the provider 18, the service station 50 may have a code reader 22 which is communicable with the vehicle's computer 10 via communications link cable 52. Further, the code reader 22 may be communicable to the provider 18 via a wide area network such as the internet. In particular, the service station 50 may be provided with a communications link 24 which connects the code reader 22 to the computer 26 linked to the wide area network. The service station 50 may activate the code reader 22 to download the trouble codes stored on the vehicle's computer 10 by virtue of linking a connector of vehicle's computer 10 to the code reader 22 (step 110), as shown in FIG. 4. Simultaneously, the trouble codes may be transmitted (step 112) to the provider 18 as the trouble codes are downloaded from the vehicle's computer 10, or alternatively, the trouble codes may be transmitted (step 112) to the provider 18 after the trouble codes have been downloaded from the vehicle's computer 10.

Further, it is contemplated that the buyer 14 or seller 16 may personally download and transmit the codes to the provider 18. In particular, the buyer 14 or seller 16 may purchase or rent the code reader 22. The buyer 14 or seller 16 may link the code reader 22 to the vehicle's computer. The codes on the vehicle's computer may then be downloaded onto the code reader 22. Thereafter, the code reader 22 may be connected to the buyer's or seller's computer for downloading the codes to the buyer's or seller's computer and retransmission to the provider 18 such as through the internet.

The diagnostic report 20 provides unique information to the buyer 14 which provides information as to the condition of the vehicle 12. However, the buyer 14 may still be skeptical about the vehicle's condition even if the diagnostic report 20 states that the vehicle 12 is in good operating condition. In this instance, confirmation of the information contained in the diagnostic report 20 may be made a condition of the purchase of the vehicle 12. In practice, the seller 16 may list or post his/her vehicle 12 for sale on a website 44 either displaying a copy of the diagnostic report 20 prepared by the provider 18 (see FIG. 3) or referring potential buyers to the provider 18 such that the provider 18 may release the diagnostic report 20 to the buyer 14 either through fax, website access, and the like.

A buyer 14 may search an online database 48 of pre-owned vehicles 12 for sale as shown in FIG. 3. The database 48 allows buyers to search for vehicles 12 based on search criteria defined by the buyer 14. By way of example and not limitation, the buyer 14 may be able to search the online database based on year, make, model of the vehicle, condition of the vehicle 12 reported by the provider 18 on the diagnostic report 20, and/or other information reported by the provider 18. The buyer 14, upon finding a list of vehicles 12 meeting the buyer 14 defined criteria, may contact the seller 16 to inspect the vehicle 12. After the inspection, if the buyer 14 desires to purchase the vehicle 12, then the buyer 14 and seller 16 may agree that the sale of the vehicle 12 be conditioned on confirmation of the downloaded trouble codes or the information/opinions stated in the diagnostic report 20 wherein confirmation may be made by a third party.

Figure 5:
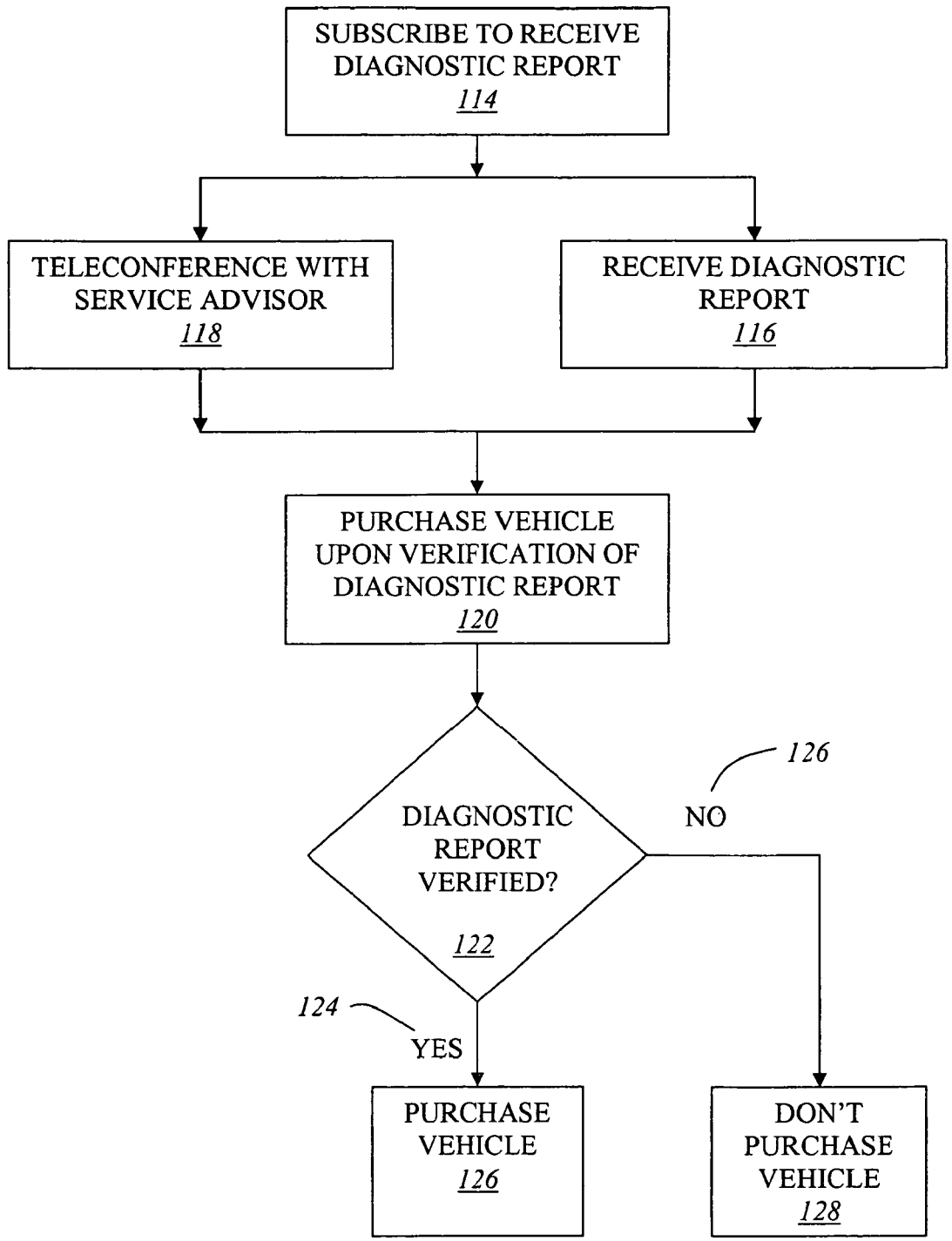
FIG. 5 is a flow chart illustrating steps a buyer may perform to use a diagnostic report in consideration of whether to purchase the vehicle.

Referring now to FIG. 5, the buyer may subscribe (step 114) with the provider 18 to receive the diagnostic report 20. Upon receipt of the diagnostic report (step 116), the buyer 14 may also have the option of contacting the service advisor 38 of the provider 18 to discuss the information contained in the diagnostic report 20, as shown by step 118 and by communications path 46 in FIG. 1. If the buyer 14 is satisfied with the report 20 and the discussions with the service advisor 38 then the buyer 14 may purchase (step 120) the vehicle 12 upon verification of the information contained in the diagnostic report 20. Once the contract (step 120) is made, the buyer 14 may have a third party verify (step 122) the information contained in the diagnostic report 20. If the third party verifies the information contained in the diagnostic report (step 124), then the buyer 14 purchases (step 126) the vehicle 12. If the third party does not verify (step 126) the information contained in the diagnostic report 20 then the buyer 14 does not have to purchase (step 128) the vehicle 12.

The above description is given by way of example, and not limitation. Given the above disclosure, one skilled in the art could devise variations that are within the scope and spirit of the invention disclosed herein, including various ways of utilizing the codes stored in the vehicle's computer 10 to assist buyers 14 and sellers 16 in the sale and purchase of the seller's vehicle 12. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of selling a vehicle based on information stored in a vehicle on-board computer, the method comprising the steps of:
    a) downloading to a code reader diagnostic data stored in the on-board computer of a vehicle being offered for sale;
    b) providing a diagnostic report associated with the vehicle offered for sale, the diagnostic report including diagnostic data represented to be the diagnostic data downloaded to the code reader from the on-board computer of the vehicle being offered for sale: and
    b) conditioning the sale of the vehicle upon post-sale confirmation of conformance between diagnostic data downloaded from the vehicle on-board computer after sale and the diagnostic data included in the diagnostic report.

2. The method of claim 1 wherein the step of providing a diagnostic report is implemented through a website.

3. The method of claim 1 wherein the diagnostic report includes OBD codes downloaded from the vehicle's computer before sale.

4. The method of claim 1 further comprising the steps of determining a condition of the vehicle before sale, based on comparison of the diagnostic data included in the report to a database, and including vehicle condition information in the diagnostic report.

5. The method of claim 4 further comprising the step of conditioning the sale of the vehicle upon post-sale confirmation of conformance between the vehicle condition after sale and the vehicle condition information included in the diagnostic report.

6. The method of claim 4 wherein the diagnostic report further comprises an estimated cost of repairs associated with the vehicle condition information included in the diagnostic report.

7. The method of claim 1 further including the steps of:
    i) downloading diagnostic data from the vehicle to a code reader after sale of the vehicle; and
    ii) comparing diagnostic data downloaded to the code reader to the diagnostic data included in the diagnostic report.

8. The method of claim 7 wherein the step of comparing diagnostic data from the vehicle after purchase of the vehicle further includes the steps of:
    i) downloading the diagnostic data from the code reader to a computer; and
    ii) comparing diagnostic data uploaded from the code reader to the diagnostic data included in the diagnostic report.

9. The method of claim 1 wherein the steps of providing a diagnostic report, and conditioning the sale of the vehicle proceed independent of any inspection of the vehicle by a mechanic.

10. The method of claim 7 further comprising the step of renting a hand held code reader to a vehicle seller for accessing the vehicle's diagnostic data.

11. The method of claim 7 further comprising the step of renting a hand held code reader to a vehicle buyer for accessing the vehicle's diagnostic data.

12. The method of claim 1 further comprising the step of requiring the buyer to pay to access the diagnostic report.

13. The method of claim 4 further comprising the step of charging the buyer to access the vehicle condition information.

14. The method of claim 1 wherein the diagnostic data includes OBD trouble codes.

15. The method of claim 7 further comprising the step of wirelessly communicating the diagnostic data from the code reader to a computer.

16. The method of claim 7 wherein the step of comparing the diagnostic data is implemented by a vehicle buyer.

17. The method of claim 7 wherein the step of comparing the diagnostic data is implemented by a third party.

18. The method of claim 5 wherein conformance between the vehicle condition after sale and the vehicle condition information included in the diagnostic report is evaluated by a third party.

19. The method of claim 8 wherein the step of downloading the diagnostic data to a computer, further comprises the step of uploading the diagnostic data to a vehicle retailer website; and wherein the step of comparing diagnostic data uploaded from the code reader is implemented on the vehicle retailer website.

* * * * *